(12) United States Patent
Topin et al.

(10) Patent No.: US 10,328,752 B2
(45) Date of Patent: Jun. 25, 2019

(54) ADAPTER FOR A WHEEL ASSEMBLY AND A WHEEL ASSEMBLY COMPRISING SAME

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Arthur Topin, Clermont-Ferrand (FR); Michel Ahouanto, Clermont-Ferrand (FR); Jacky Pineau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 144 days.

(21) Appl. No.: 15/514,394

(22) PCT Filed: Sep. 22, 2015

(86) PCT No.: PCT/EP2015/071711
§ 371 (c)(1),
(2) Date: Mar. 24, 2017

(87) PCT Pub. No.: WO2016/046197
PCT Pub. Date: Mar. 31, 2016

(65) Prior Publication Data
US 2017/0291457 A1    Oct. 12, 2017

(30) Foreign Application Priority Data
Sep. 24, 2014  (FR) ...................................... 14 58987

(51) Int. Cl.
*B60C 5/16*       (2006.01)
*B60B 21/12*      (2006.01)
(Continued)

(52) U.S. Cl.
CPC ........ *B60C 15/0209* (2013.01); *B60B 21/125* (2013.01); *B60B 25/22* (2013.01);
(Continued)

(58) Field of Classification Search
CPC ....... B60B 21/125; B60B 21/10; B60B 25/22; B60C 15/02; B60C 15/0209; B60C 15/0206; B60C 15/0223; B60C 5/16
See application file for complete search history.

(56) References Cited

U.S. PATENT DOCUMENTS 3,662,597 A     5/1972  DeGhetto
3,915,214 A *  10/1975  Pile .......................... B60B 21/12
                                                        152/379.3
(Continued)

FOREIGN PATENT DOCUMENTS

DE      25 14 883       10/1976
EP      0 633 150        1/1995
(Continued)

*Primary Examiner* — Kip T Kotter
(74) *Attorney, Agent, or Firm* — Cozen O'Connor (57) ABSTRACT

Adapter providing the connection between one tire bead and the rim. An axially inner end of the adapter is mounted on the rim seat, an axially outer end is mounted on the rim seat, a body connects said outer end to said inner end, a substantially cylindrical adapter seat receives one of said beads, and an adapter bearing face is substantially contained in a plane perpendicular to the axis. The reinforcer element of the axially outer end is entirely situated axially outside the bearing face. The body comprises, opposite the adapter seat, an annular seat protuberance, said protuberance comprising at least one rubber composition.

17 Claims, 4 Drawing Sheets

(51) Int. Cl.
*B60B 25/22* (2006.01)
*B60C 15/02* (2006.01)

(52) U.S. Cl.
CPC .............. *B60C 5/16* (2013.01); *B60C 15/02* (2013.01); *B60C 15/0206* (2013.01); *B60C 15/0223* (2013.01); B60B 21/12 (2013.01); B60B 2360/36 (2013.01); B60B 2360/50 (2013.01); B60B 2900/3312 (2013.01); B60B 2900/351 (2013.01); B60B 2900/711 (2013.01)

(56) References Cited

U.S. PATENT DOCUMENTS

| | | | | |
|---|---|---|---|---|
| 4,373,567 | A * | 2/1983 | Declercq | B60B 21/10 152/379.3 |
| 4,408,379 | A * | 10/1983 | Kusano | B21D 53/30 29/894.353 |
| 5,232,033 | A * | 8/1993 | Durif | B60B 21/10 152/379.3 |
| 5,232,034 | A * | 8/1993 | Gergele | B60C 5/16 152/379.4 |
| 6,626,217 | B2 * | 9/2003 | Bestgen | B60B 25/18 152/379.4 |
| 2016/0311255 | A1 * | 10/2016 | Ahouanto | B60C 15/0213 |
| 2017/0001472 | A1 * | 1/2017 | Ahouanto | B60C 15/02 |
| 2017/0001473 | A1 * | 1/2017 | Ahouanto | B60C 15/02 |
| 2017/0057299 | A1 * | 3/2017 | Daval | B60C 15/02 |

FOREIGN PATENT DOCUMENTS

| | | |
|---|---|---|
| FR | 2 795 022 | 12/2000 |
| GB | 2 085 375 | 4/1982 |
| WO | WO 92/01577 | 2/1992 |

\* cited by examiner

ADAPTER FOR A WHEEL ASSEMBLY AND A WHEEL ASSEMBLY COMPRISING SAME

RELATED APPLICATIONS

This is a U.S. National Phase Application under 35 USC 371 of International Application PCT/EP2015/071711 filed on Sep. 22, 2015.

This application claims the priority of French application no. 1458987 filed Sep. 24, 2014, the entire content of which is hereby incorporated by reference.

FIELD OF THE INVENTION

The invention relates to an adapter for a rolling assembly formed mainly of a tire and a rim, and to a rolling assembly comprising said adapter. The invention more particularly relates to tires for passenger vehicles and for heavy vehicles.

Definitions

A reminder of the definitions used in the present invention is given below:
"axial direction" is a direction parallel to the rotation axis of the tire,
"radial direction" is a direction that intersects the rotation axis of the tire and is perpendicular thereto,
"circumferential direction" is a direction perpendicular to a radius and contained in a plane perpendicular to the rotation axis of the tire,
"radial section" is a section in a plane which contains the rotation axis of the tire,
"equatorial plane" is a plane which is perpendicular to the rotation axis and passes through the middle of the tread,
"rubber composition" is a composition of rubber comprising at least one elastomer and a filler.

BACKGROUND OF THE INVENTION

The ease with which a tire becomes unseated (that is to say with which the bead of the tire leaves its seat) and then comes off the rim (becomes detached from the rim) when its inflation pressure decreases and when a transverse load is applied to the tire is one of the tire features that is important for the safety of the passengers of a vehicle equipped with tires. The standardization authorities have thus set target values to be achieved (as for example in Chinese standard GB/T 2978-2008) and corresponding test methods (for example the method recommended in Chinese standard GB/T 4502-2009). An example of a test method is also described in the U.S. Pat. No. 3,662,597, according to which a conical form is applied against a sidewall of the tire and then the pressure exerted on the sidewall is increased and the movement of the sidewall is recorded. A similar test method has been adopted in "Federal Motor Vehicle Safety Standard No. 109" by the NHTSA (National Highway Traffic Safety Administration), the American federal road safety organization.

Among the envisaged solutions, the resistance to unseating could be increased by bonding the tire to the mounting rim, but this solution has the drawback of making it very difficult to remove the tire. It would also be possible to modify the geometry of the rim in order to make unseating more difficult, but this approach would require destandardization.

The document GB 2 085 375 A discloses an adapter that can be disposed between each tire bead and each rim flange. Each adapter comprises an axially outer end and an axially inner end that each have a reinforcer. Each reinforcer is surrounded by a single ply (elastomeric material/textile reinforcer). This ply connects each of the ends to one another.

The document DE 25 14 883 A1 describes a mounted assembly comprising a tire, a rim and at least one adapter. This adapter also comprises an axially outer end and an axially inner end that each comprise a reinforcer. Each end comprises a stop ring having reinforcing inserts made up of textile or metal threads. Moreover, the adapter of that document rests entirely on the rim.

However, such adapters also comprise complex constituents of the reinforcement ply type comprising an elastomeric composition and textile reinforcers, as connecting elements, and do not allow a mounted assembly to radially deform correctly.

SUMMARY OF THE INVENTION

One object of the present invention is to provide a device which is simpler and less complex than those that are already known, and which prevents the bead of the tire from leaving its seat at low pressure and under a high lateral load, while maintaining easy mounting.

This and other objects are attained in accordance with one aspect of the invention directed to an adapter for a rolling assembly having a rotation axis and comprising:
a tire having two beads, and
a rim,
said adapter providing the connection between one of the beads and the rim, said rim having two rim seats and two rim flanges,
said adapter having:
an axially inner end that is intended to be mounted on the rim seat and comprises an inner reinforcer element,
an axially outer end that comprises an outer reinforcer element,
a body that connects said outer end to said inner end so as to form a single piece and comprises at least one main reinforcement that provides the connection between said outer reinforcer and said inner reinforcer,
a substantially cylindrical adapter seat intended to receive one of said beads, said seat being situated at the axially outer end of said body,
an adapter bearing face substantially contained in a plane perpendicular to the rotation axis, said bearing face being situated on the axially inner face of the axially outer end.

The adapter is characterized in that the reinforcer element of the axially outer end is entirely situated axially outside the bearing face, and in that the body comprises, opposite the adapter seat, an annular seat protuberance, said protuberance comprising at least one rubber composition. Said protuberance is preferably disposed radially outside said body of the adapter.

The axially outer end of the adapter delimits, axially, a "housing intended to receive the bead of the tire". The bearing face of the axially outer end serves to support the bead of the tire in the axial direction, in the same way as a rim flange.

In this way, the housing receives the bead of the tire just as the seat of a rim conventionally does. The tire is then immobilized axially by the inflation pressure and is pressed against the bearing face of this axially outer end in the same way as is conventionally done for the bead of a tire against the rim flange of a rim.

The axially inner end of the adapter may be denoted "adapter bead" since it is intended to couple the adapter to the rim flange of a rim in the same way as is conventionally done by the bead of a tire.

Thus, when the rolling assembly according to the invention is in operation and at the operating stresses for which it is designed, the tire is immobilized axially with respect to the rim, more specifically the beads of the tire are immobilized axially with respect to the rim in the same way as for a conventional rolling assembly in which the beads of the tire are mounted directly on the seats of a rim, while the beads of the tire are not immobilized radially with respect to the rim, more specifically the beads of the tire are capable of a degree of radial movement with respect to the rim. Under standard rolling conditions, it may be said that there is virtually no axial deformation of the adapter, or that it is negligible with respect to the radial deformation.

On the other hand, during an impact, the axial deformation of the adapter can be great, thereby contributing to reducing the stresses on the mounted assembly.

The adapter according to the invention has the advantage of having a simple design and being easy to mount. The adapter according to the invention also makes it possible to effect less tight clamping than when use is made of a standard rim, which is much less rigid. This is because the annular protuberance makes it possible to reduce the clamping pressure applied when the tire is mounted on the rim.

Moreover, the adapter according to the invention allows a mounted assembly to deform along the radial axis during an impact.

Another aspect of the invention is directed to a rolling assembly made up of a tire comprising two beads and a rim. This assembly is characterized in that it comprises at least one adapter as defined above, the adapter providing the connection between a bead of the tire and the rim.

Preferably, the protuberance has a substantially elongate shape which extends axially in at least one axial direction.

Preferably, the body comprises an annular seat reinforcer in said main reinforcement and opposite the adapter seat, or at the radially outer surface of said main reinforcement and opposite the adapter seat, or simultaneously in and at the surface of said main reinforcement and opposite the adapter seat.

The annular seat reinforcer is made up of at least one rubber composition and metal and/or textile reinforcers.

Preferably, the annular seat protuberance has a compression modulus greater than or equal to 1 and less than or equal to 50 MPa and preferably greater than or equal to 20 and less than or equal to 50 MPa. The protuberance can be made up of at least two layers of rubber composition that are different or identical and disposed in alternation when they are different.

Preferably, the annular seat protuberance has a total axial length greater than or equal to 5 mm and less than or equal to 40 mm, and preferably greater than or equal to 5 mm and less than or equal to 20 mm. This protuberance may have a radial thickness greater than or equal to 0.5 mm and less than or equal to 3 mm, and preferably greater than or equal to 1 mm and less than or equal to 1.5 mm.

The protuberance according to an embodiment of the invention may be directly next to the bearing face or spaced apart from this bearing face by a length "m" greater than or equal to 5 mm and less than or equal to 20 mm. The protuberance may also extend at the radially outer surface of the body in the axially inward direction. When it extends in this direction, the protuberance has a radial thickness which decreases in said direction so as to have only a maximum thickness radially in line with the adapter seat.

Said protuberance may also extend in the axially outward direction until it is positioned against the bearing surface of the adapter. In this case, the radial thickness of the protuberance may or may not decrease progressively.

The annular seat reinforcer may have a compression modulus greater than or equal to 1 GPa, and preferably greater than 4 GPa, and more preferably greater than 10 GPa. It may be made up of a core surrounded by a rubber composition. The core preferably comprises at least one element chosen from a metal, a composite material, a thermoplastic, and a mixture thereof. The composite material may be made from glass fibres embedded in a resin material.

Preferably, the annular seat reinforcer has an overall axial length greater than or equal to 30% of the width of the bead of the tire, and less than 150% of this same width, and more preferably an axial length of between 40 and 110% of the width of the bead of the tire.

Preferably, the annular seat reinforcer has a mean radial thickness greater than or equal to 0.3 mm and less than or equal to 20 mm.

When the rolling assembly according to an embodiment of the invention comprises two adapters according to an embodiment of the invention, these adapters can each have a body with a different or identical length. Preferably, the length of the body may be between 65 mm and 135 mm.

The rolling assembly according to an embodiment of the invention may comprise a rim made from a material chosen from alloys of aluminium and/or of magnesium, composite materials based on carbon fibres, glass fibres, aramid fibres, plant fibres, said fibres being comprised in a matrix based on thermosetting compounds or on thermoplastic compounds, or from a complex compound comprising an elastomer and a complex based on resin and fibres chosen from carbon fibres, glass fibres, aramid fibres, plant fibres or from any combination of materials.

The fibre-based composite materials may comprise fibres having a length greater than or equal to 5 mm.

The matrix based on thermosetting compounds is preferably chosen from epoxy resins, vinyl ester, unsaturated polyesters, cyanate ester, bismaleimide, acrylic resins, phenolic resins, polyurethanes and combinations thereof.

The matrix based on thermoplastic compounds is preferably chosen from polypropylene (PP), polyethylene (PE), polyamides (PAs), semiaromatic polyamides, polyester (PET), polybutylene terephthalate (PBT), polyetheretherketone (PEEK), polyetherketoneketone (PEKK), polyethersulphone (PSU), polyetherimide (PEI), polyimide (PI), polyamideimide (PAI), polyphenylenesulphide (PPS), polyoxymethylene (POM), polyphenylene oxide (PPO).

The adapter may comprise at least one, removable or otherwise, conductive strip positioned over all or part of the circumferential perimeter of said adapter and along a complete path extending from the adapter seat to the rim J.

Preferably, the conductive strip is positioned entirely at the radially outer surface of the body or is partially buried under the radially outer surface of the body.

Preferably, the conductive strip has an electrical resistivity less than or equal to $10^8$ Ohm·cm, and preferably less than or equal to $10^7$ Ohm·cm.

Preferably, the conductive strip is made up, as desired, of a metallic leaf or of an elastomeric composition comprising carbon black in a quantity greater than or equal to 15% and preferably greater than or equal to 20%, it being possible for the carbon black in the elastomeric composition to have a specific surface area greater than or equal to 500 m²/g.

Preferably, the conducting strip is bonded or crosslinked to the elastomeric composition of the body.

BRIEF DESCRIPTION OF THE DRAWINGS

The invention will now be described with the aid of the examples and figures which follow and which are given purely by way of illustration, and in which.

DETAILED DESCRIPTION OF THE DRAWINGS

Figure 1:
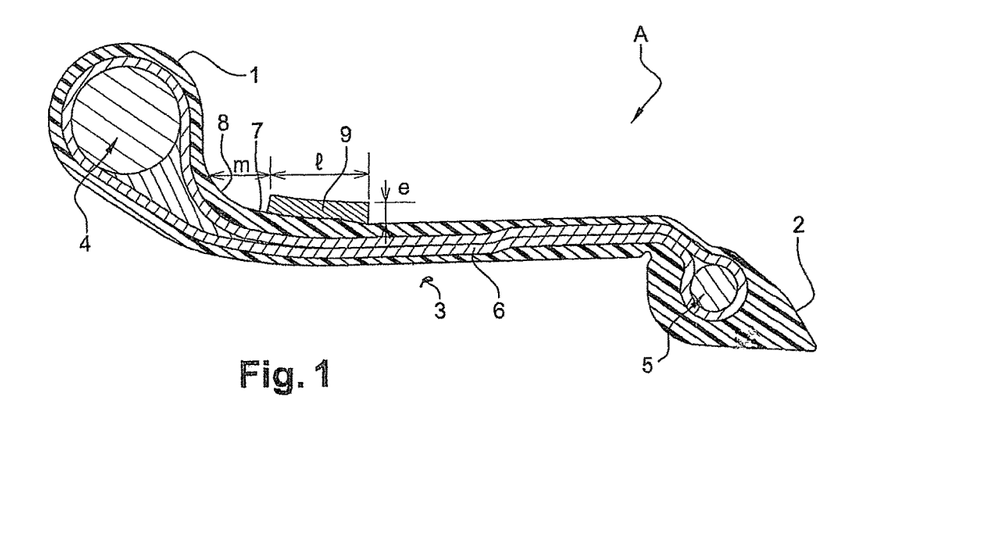
FIG. 1 schematically shows, in radial section, the adapter according to a first embodiment of the invention, not mounted between a rim and a tire, FIG. 2 schematically shows, in radial section, the adapter according to a second embodiment of the invention, not mounted between a rim and a tire, FIG. 3 schematically shows, in radial section, the adapter according to a third embodiment of the invention, not mounted between a rim and a tire, FIG. 4 schematically shows, in radial section, the adapter according to a fourth embodiment of the invention, not mounted between a rim and a tire.

As FIG. 1 shows, the adapter, with the overall reference A, mainly comprises an axially outer end 1, an axially inner end 2 and a body 3 that connects said end 1 to said end 2.

As shown in FIG. 1, the adapter according to the invention, with the overall reference A, is not mounted on a rim. This adapter comprises, on one side, an axially outer end 1 with an outer reinforcer 4 having a substantially spherical geometric shape in section, consisting of a composite material such as glass-fibre-reinforced plastic, and, on the other side, an axially inner end 2 with a metal reinforcer 5, and finally a body 3 made up of two plies 6 that comprise textile cords. The cords of each ply 6 are mutually parallel. On one side, said plies 6 are joined axially on the inside and radially on the outside to the walls of the reinforcer 4, and on the other side, they are anchored, in the end 2, to the metal reinforcer 5, such as a bead wire that thus forms a turn-up at each end.

The body 3 comprises a substantially cylindrical adapter seat 7 that is intended to receive a bead of the tire (see FIG. 5) that is positioned at the axially outer end of the body 3.

The body 3 also comprises an adapter bearing face 8 that is contained substantially in a plane perpendicular to the rotation axis, is situated on the axially inner face of the axially outer end, and is intended to keep the bead of the tire in place in its housing. This adapter seat 7 comprises an annular seat protuberance 9 comprising a rubber composition. Said protuberance 9 has a compression modulus of between 2 and 50 MPa. It has a total axial length "l" equal to 20 mm, a radial thickness "e" equal to 2 mm, and is spaced apart from said bearing face 8 by a length "m" equal to 6 mm.

Figure 2:
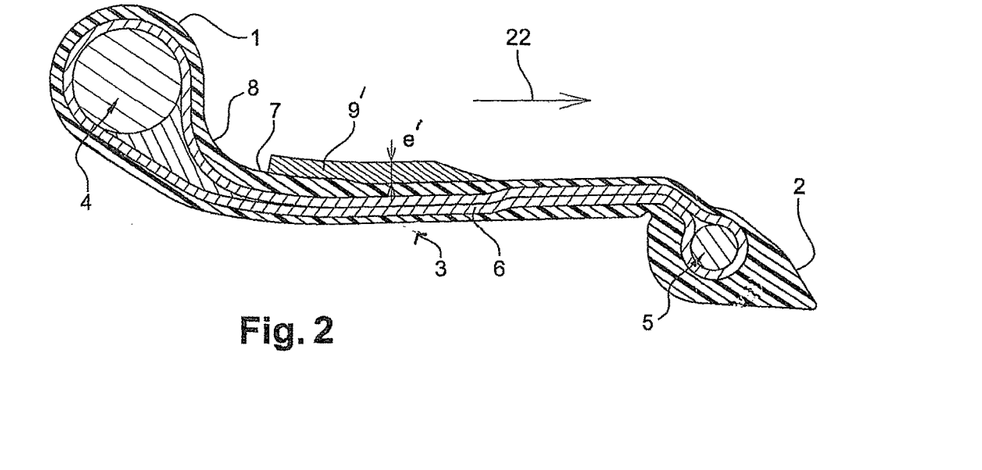

The variant in FIG. 2 shows that the protuberance 9' on the adapter according to the invention extends axially in the inward direction (indicated by the arrow 22) while having a decreasing thickness "e'".

Figure 3:
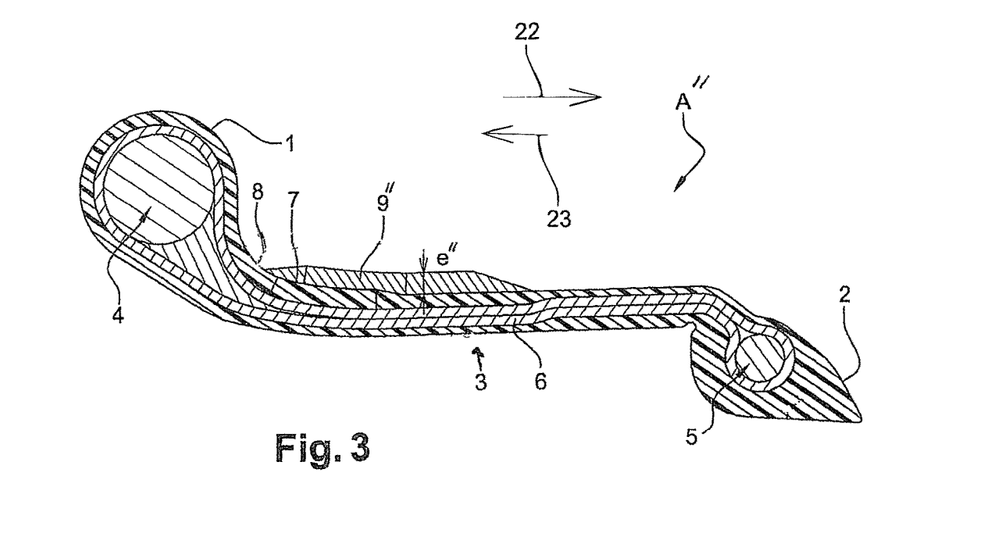

The variant in FIG. 3 shows that the protuberance 9''' extends axially in the inward direction (indicated by the arrow 22) and in the outward direction (indicated by the arrow 23) while having a decreasing thickness "e''" in both directions 22, 23.

Figure 4:
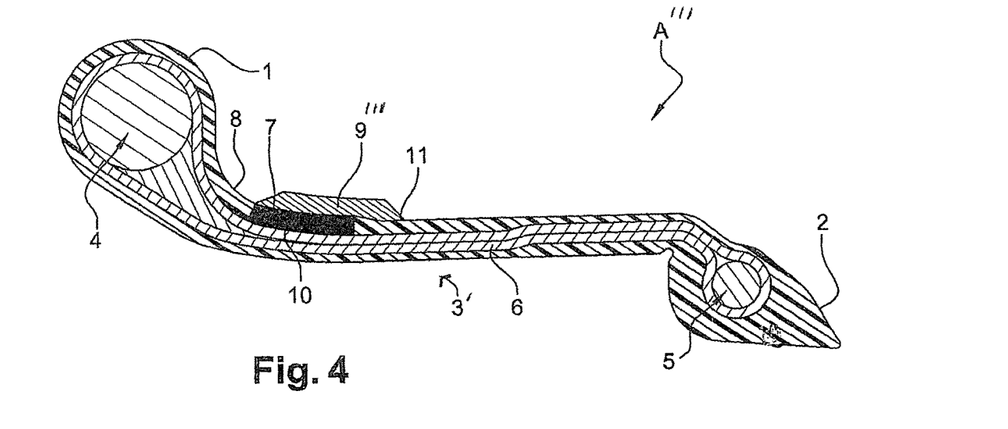

As FIG. 4 shows, an annular seat reinforcer 10 having a compression modulus equal to 100 GPa is disposed in said main reinforcement 6 of the body 3'.

The annular seat reinforcer 10 is not secured to the outer reinforcer 4. These two reinforcers 10 and 4 are entirely independent of one another.

The reinforcer 10 is made up of a tri-layer comprising metal reinforcers in the form of wires, alternating with an elastomer of the rubber-resin type. The reinforcer 10 has a total radial thickness of about 1.5 mm and a total axial length of about 15 mm.

The elastomer layer of the reinforcer 10 has a radial thickness of about 0.3 mm and an axial length of about 15 mm.

A layer of rubber composition 11 covers all of the elements that make up the adapter, namely the reinforcer 6, the reinforcer 5, the body 3' and the radially outer surface of the reinforcer 10.

Figure 5:
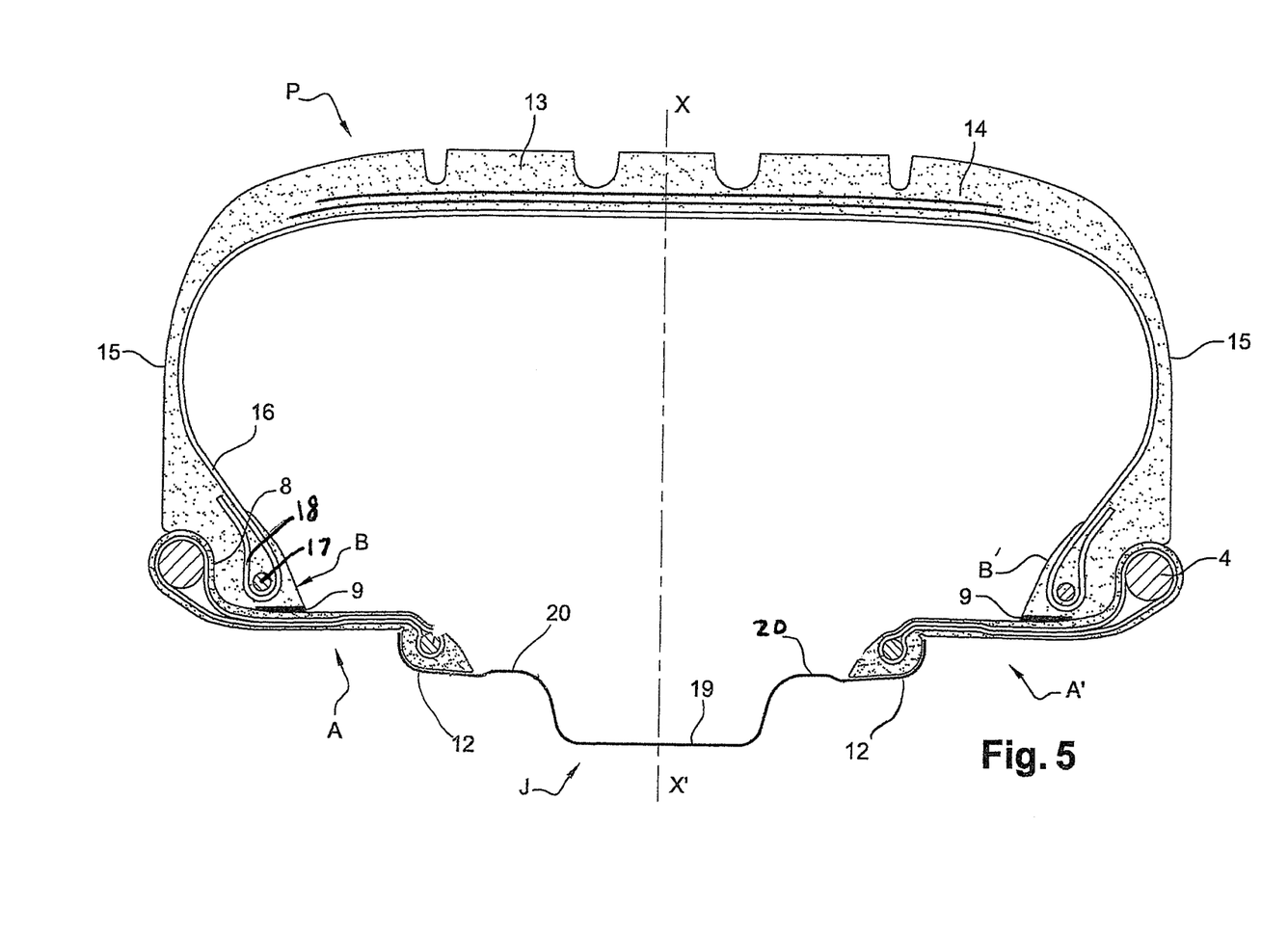
FIG. 5 shows a schematic view in radial section of two adapters according to an embodiment of the invention, mounted between a rim and a tire.

FIG. 5 shows, in radial section, a tire P, each bead B of which is positioned on the adapter seat 7 of two adapters A and A'. Said adapters A and A' are each connected to a rim flange 12 of a rim J.

The tire, which is of unaltered design per se in the invention, consists of a tread 13 reinforced by a crown reinforcement 14 joined to two beads B on either side of an equatorial plane XX' by way of two sidewalls 15. A carcass reinforcement 16 that mainly reinforces the sidewalls 15 is anchored in each bead B to at least one bead wire, in this case of the "braided" type 17, so as to form turn-ups 18.

It is important to note that the invention can be implemented with a very large number of types of tire, be they radial tires or cross-ply tires, or even with tires of the type having self-supporting sidewalls.

The rim J comprises a groove 19, known as a mounting groove, that connects, on either side of the equatorial plane, two rim seats 20 that are axially extended by rim flanges 12, the radially outer edges of which are curved.

The tire is mounted in a conventional manner. When the tire has been mounted, the annular seat protuberance 9 is squashed between the bead B of the tire P and the adapter body 3. The thickness of said protuberance 9 is variable depending on the size of the tire and/or of the associated rim.

Figure 6:
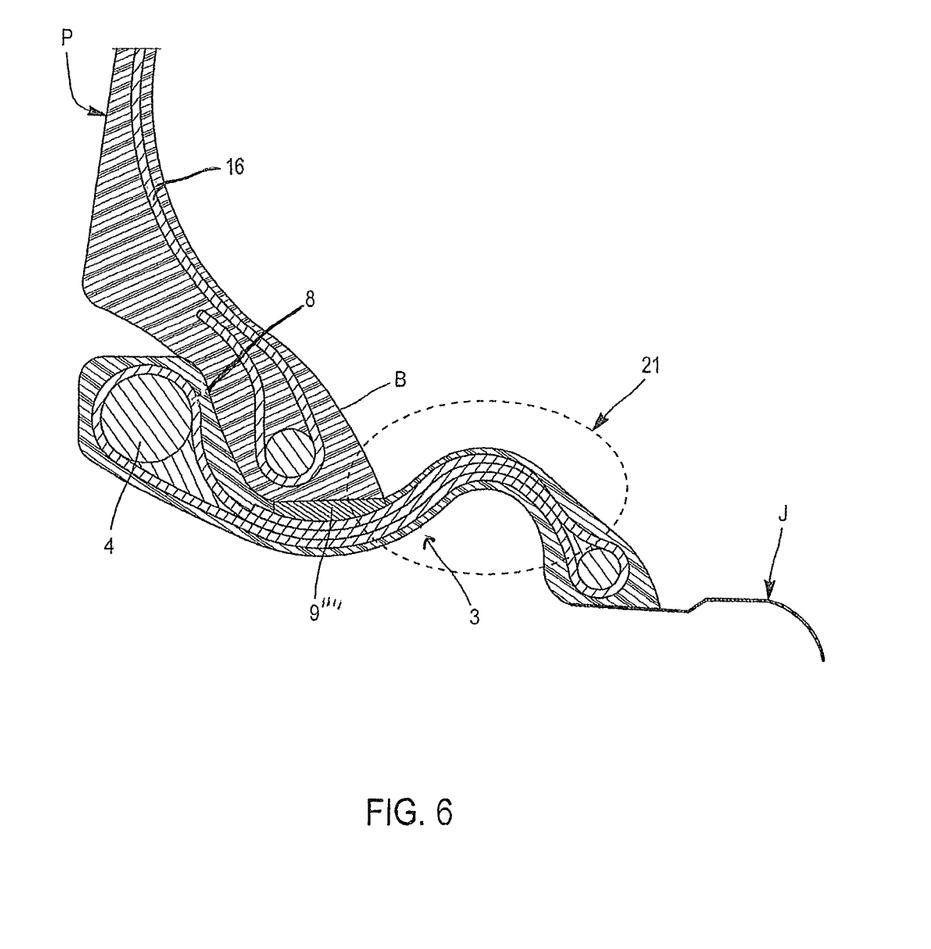
FIG. 6 shows an enlarged schematic view in radial section of the adapter according to an embodiment of the invention, mounted between a rim and a tire that are shown in part.

During the mounting of the assembly comprising the tire, the adapter and the rim according to the invention, it is possible to bring about a deformation, with the overall reference 21, on the adapter, as is shown in FIG. 6. This deformation 21 is situated on the axially inner part of the body 3 of the adapter. The annular seat protuberance 9'''' is located squashed between the bead B of the tire and the body 3 of the adapter. The presence of this protuberance 9'''', combined with this deformation 21, makes it possible to improve the unseating prevention of the tire while applying a clamping pressure identical to that of a conventional rim.

Table I below collates the values of clamping pressure applied to a mounted assembly with a standard rim (Control), with a standard adapter and rim (Known adapter) and with an adapter comprising an annular seat protuberance and a standard rim (Adapter of the invention).

TABLE I

| | |
|---|---|
| Control | −26 bar |
| Known adapter | −6 bar |
| Adapter of the invention | −24 bar |

The results in this Table I show that the known adapter exhibits clamping pressure equivalent to that of the control, while the adapter according to the invention exhibits clamping pressure much lower than that of the control. This makes it possible to explain the differences observed in an unseating test.

The following example shows the results obtained with the adapter according to the invention.

Example: Unseating Test

This test consists in determining the unseating performance of a tire of size 225/45 R17 on a reference 7.5J17 rim, running at 60 km/h on a circle of 30 m radius. Several passages are effected and the pressure is decreased regularly by 0.1 bar on each passage until the tire unseating pressure is obtained. This unseating pressure makes it possible to quantify the unseating performance of the mounted assembly.

Table II below collates the results obtained.

TABLE II

| | Unseating pressure in bar |
|---|---|
| Control | 0.9 |
| Known adapter | 0.9 |
| Adapter of the invention | 1.6 |

The results in Table II above show that with the adapter according to the invention, the tire is unseated at virtually double the pressure compared with that of the control.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An adapter for a rolling assembly having a rotation axis and comprising:
   a tire having two beads;
   a rim;
   said adapter providing the connection between one of the beads and the rim;
   said rim having two rim seats and two rim flanges;
   said adapter having:
      an axially inner end that is configured to be mounted on one of the rim seats of the tire and comprises an inner reinforcer element,
      an axially outer end that comprises an outer reinforcer element,
      a body that connects said axially outer end to said axially inner end, the body comprising a two-ply reinforcement that provides a connection between said outer reinforcer element and said inner reinforcer element,
      a substantially cylindrical adapter seat adapted to receive one of said beads of the tire, said adapter seat arranged at an axially outer end of said body,
      an adapter bearing face substantially contained in a plane perpendicular to the rotation axis, said adapter bearing face being arranged on an axially inner face of the axially outer end,
   wherein the outer reinforcer element of the axially outer end is entirely situated axially outside the adapter bearing face, and wherein the body comprises, arranged on the adapter seat, an annular seat protuberance, said annular seat protuberance comprising at least one rubber composition, the annular seat protuberance being configured to be compressed between one of said beads of the tire and the body of the adapter.

2. The adapter according to claim 1, wherein the annular seat protuberance has a substantially elongate shape which extends axially in at least one axial direction.

3. The adapter according to claim 1, wherein the annular seat protuberance has a compression modulus greater than or equal to 1 and less than or equal to 50 MPa.

4. The adapter according to claim 1, wherein the annular seat protuberance has a total axial length greater than or equal to 5 mm and less than or equal to 40 mm.

5. The adapter according to claim 1, wherein the annular seat protuberance has a radial thickness greater than or equal to 0.5 mm and less than or equal to 3 mm.

6. The adapter according to claim 1, wherein the annular seat protuberance is spaced apart from said adapter bearing face by a length "m" greater than or equal to 5 mm and less than or equal to 20 mm.

7. The adapter according to claim 1, wherein the annular seat reinforcer has a compression modulus greater than or equal to 1 GPa.

8. The adapter according to claim 1, wherein the annular seat reinforcer has an overall axial length greater than or equal to 30% of the width of the bead of the tire, and less than 150% of this same width.

9. The adapter according to claim 8, wherein the annular seat reinforcer has an axial length of between 40% and 110% of the width of the bead of the tire.

10. The adapter according to claim 1, wherein the annular seat reinforcer has a mean radial thickness greater than or equal to 0.3 mm and less than or equal to 20 mm.

11. A rolling assembly comprising a tire comprising two beads and a rim, wherein the rolling assembly comprises at least one adapter according to claim 1, the adapter providing the connection between a bead of the tire and the rim.

12. The rolling assembly according to claim 11, comprising a first and a second adapter that each have a body with a different or identical length.

13. The rolling assembly according to claim 11, wherein the rim is made from a material chosen from steel, alloys of aluminium and/or of magnesium, composite materials based on carbon fibres, glass fibres, aramid fibres, plant fibres, said fibres being comprised in a matrix based on thermosetting compounds or on thermoplastic compounds, or from a compound comprising an elastomer and a complex based on resin and fibres comprising at least one selected from the group of: carbon fibres, glass fibres, aramid fibres, and plant fibres.

14. The rolling assembly according to claim 13, wherein the fibre-based composite materials comprise fibres having a length greater than or equal to 5 mm.

15. The rolling assembly according to claim 13, wherein the matrix based on thermosetting compounds comprises at least one selected from the group of: epoxy resins, vinyl ester, unsaturated polyesters, cyanate ester, bismaleimide, acrylic resins, phenolic resins, and polyurethanes.

16. The rolling assembly according to claim 13, wherein the matrix based on thermoplastic compounds is chosen from polypropylene (PP), polyethylene (PE), polyamides (PAs), semiaromatic polyamides, polyester (PET), polybutylene terephthalate (PBT), polyetheretherketone (PEEK), polyetherketoneketone (PEKK), polyethersulphone (PSU), polyetherimide (PEI), polyimide (PI), polyamideimide (PAI), polyphenylenesulphide (PPS), polyoxymethylene (POM), and polyphenylene oxide (PPO).

17. An adapter for a rolling assembly having a rotation axis and comprising:
  a tire having two beads;
  a rim;
  said adapter providing the connection between one of the beads and the rim;
  said rim having two rim seats and two rim flanges;
  said adapter having:
    an axially inner end that is configured to be mounted on one of the rim seats of the tire and comprises an inner reinforcer element,
    an axially outer end that comprises an outer reinforcer element,
    a body that connects said axially outer end to said axially inner end, the body comprising a two-ply reinforcement that provides a connection between said outer reinforcer element and said inner reinforcer element,
    a substantially cylindrical adapter seat adapted to receive one of said beads of the tire, said adapter seat arranged at an axially outer end of said body,
    an adapter bearing face substantially contained in a plane perpendicular to the rotation axis, said adapter bearing face being arranged on an axially inner face of the axially outer end,
  wherein the outer reinforcer element of the axially outer end is entirely situated axially outside the adapter bearing face, and wherein the body comprises, arranged on the adapter seat, an annular seat protuberance, said annular seat protuberance comprising at least one rubber composition, and
  wherein the body comprises an annular seat reinforcer arranged at a radially outer surface of said two-ply reinforcement and opposite the adapter seat.

\* \* \* \* \*